June 2, 1942.  J. W. WHITE  2,284,935
MASTER CYLINDER
Filed June 29, 1939
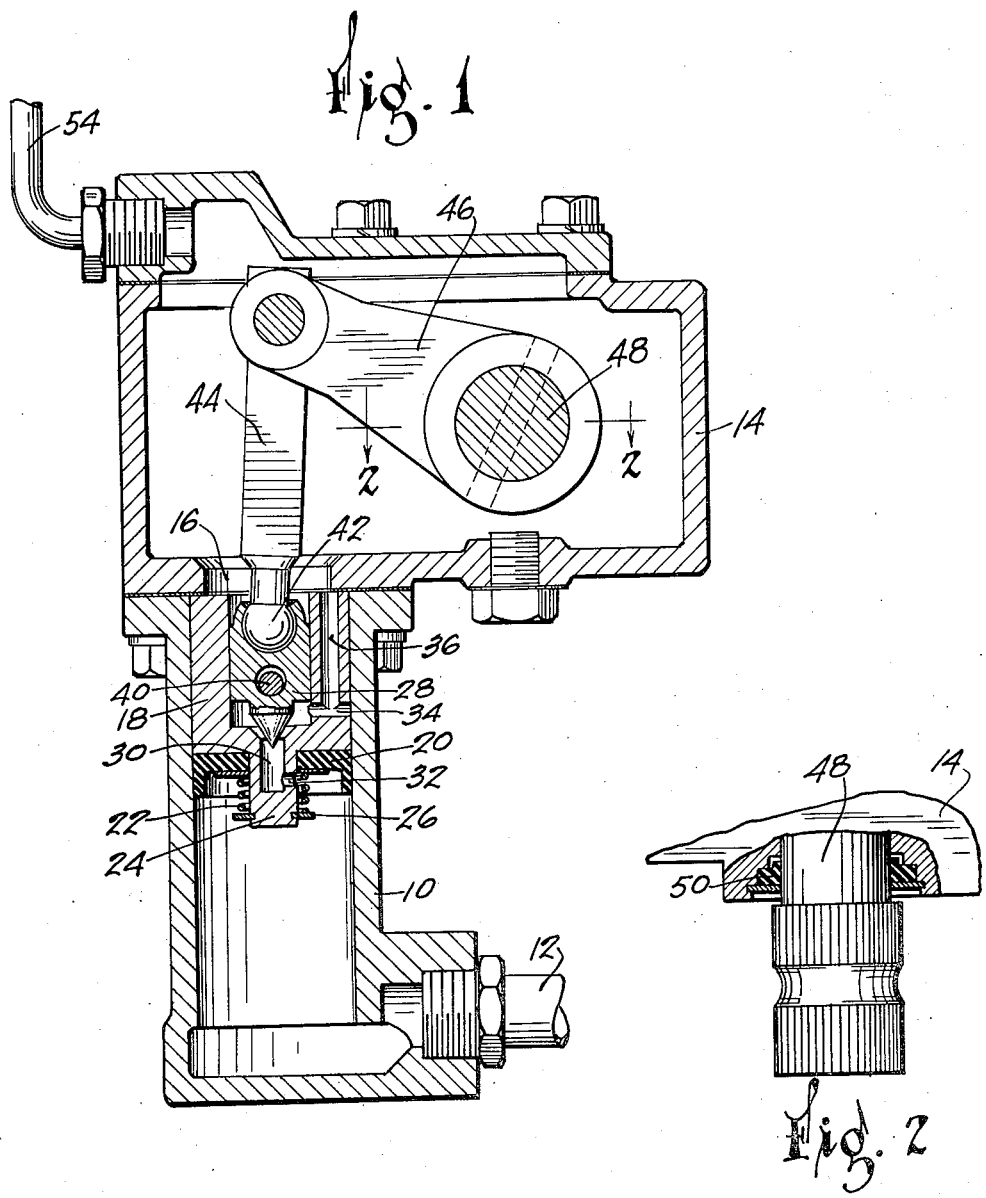
INVENTOR.
JOHN W. WHITE
BY A. R. McCrady
ATTORNEY.

Patented June 2, 1942

2,284,935

UNITED STATES PATENT OFFICE 2,284,935

MASTER CYLINDER

John W. White, South Bend, Ind., assignor to Bendix Aviation Corporation, South Bend, Ind., a corporation of Delaware Application June 29, 1939, Serial No. 281,830

2 Claims. (Cl. 60—54.6)

This invention relates to master cylinders, and is illustrated as embodied in the master cylinder of a hydraulic brake system. The illustrated master cylinder device is, however, adapted for use with clutch and throttle controls and other mechanisms in which hydraulic pressure is required.

An object of the invention is to improve the operation of such a master cylinder, by returning the piston positively on the release stroke of the applying means, with a relief passage wide open so that the returning piston cannot build up a suction in the hydraulic lines. To this end the passage through the piston is best controlled by a valve member which is connected to the applying means, and which has a lost-motion connection with the piston so that it withdraws the piston positively after first opening the relief passage. This arrangement is especially suitable for a vertically-arranged cylinder.

Another object is to house the operating shaft and the connections therefrom to the piston, to minimize the use of exposed moving parts. Preferably they are housed in a liquid reservoir above and communicating with the cylinder.

The above and other objects and features of the invention will be apparent from the following description of the illustrative embodiment shown in the accompanying drawing, in which:

Figure 1 is a vertical section through the entire master cylinder device; and

Figure 2 is a partial section on the line 2—2 of Figure 1.

The illustrated master cylinder device comprises a vertically-arranged cylinder proper 10 having at its lower end a conduit connection 12 leading to the brakes or other devices to be operated, and having its flanged open upper end bolted or otherwise secured to the lower face of a liquid reservoir 14.

The reservoir 14 communicates with the cylinder 10 through an opening 16 which is slightly smaller than the bore of the cylinder, so that the bottom of the reservoir serves as a stop for a piston 18 in the cylinder, when drawn upwardly to its released position. The piston 18 is faced with a rubber packing cup 20 held against its lower face by a spring 22 encircling a boss 24 on the piston and held by a washer 26.

The piston 18 is formed with a cylindrical vertical bore for a piston valve member 28 having a conical boss on its lower face adapted to engage a seat at the upper end of a vertically extending recess 30. The recess 30 extends into the boss 24, and forms part of a passage through the piston. The entire passage consists of the recess 30, an opening 32 through the wall of the boss 24 below the packing cup 20, the lower part of the bore for the valve member 28, an opening 34 through the side wall of the piston, and the central opening of a hollow sleeve or bushing 36 set into the top of the piston and communicating at its lower end with the opening 34 and at its upper end with the opening 16.

The valve member 28 is formed with an opening surrounding a transverse pin 40 carried by the piston 18, the opening being larger than the pin, thus forming a lost motion connection between the valve member and the piston.

On its downward stroke the valve member first closes the passage through the piston and then forces the piston downwardly to build up pressure in the line 12. On its upward stroke the valve member first opens the passage through the piston, so that liquid may pass freely from reservoir 14 into cylinder 10 to prevent building up any suction in line 12, and then lifts the piston back to its initial position.

The upper face of the valve member 28 is formed with a socket which is peened over to embrace and form a positive universal joint with a ball 42 on the lower end of a generally vertical connecting rod 44, the upper end of which is pivoted to an arm 46 rigid with a shaft 48 journaled in and extending transversely of the reservoir 14. One end of the shaft 48 extends through a seal 50 in the reservoir wall, and is formed to receive a lever or the like connected to the brake pedal or other operating device. While other forms of applying means may utilize many of the advantages of my invention, the arrangement described above has the added advantage of housing most of the moving parts within the reservoir.

If sufficient liquid cannot be carried in the reservoir 14, the detachable cover of the reservoir may be provided with a conduit 54 connecting it to an auxiliary reservoir (not shown) at a higher level. Ordinarily the auxiliary reservoir should be subject to atmospheric pressure, having a suitable vent or valve for that purpose.

While one illustrative embodiment has been described in detail, it is not my intention to limit the scope of the invention to that particular embodiment, or otherwise than by the terms of the appended claims.

I claim:

1. A master cylinder device comprising a cylinder having mounted therein a piston having a recess, the said piston also having a passage connecting the recess to one end of the piston and a second passage parallel to the recess and connecting the recess to the other end of the piston, a valve member arranged to close the first of said passages, said valve member comprising a second piston slidingly engaging the walls of the recess and having associated therewith a conical projection arranged to extend at times into the first of the passages in the first piston, applying means for operating the valve member to actuate the said first piston, and a lost motion connection between the valve member and the first piston such that on the release stroke the applying means draws the said first piston backwardly in the cylinder with the first said passage in the piston open.

2. A master cylinder device comprising a cylinder having mounted therein a piston having a recess, the said piston also having a passage connecting the recess to one end of the piston and a second passage connecting the recess to the other end of the piston, a valve member arranged to close one of said passages, said valve member including a piston slidingly engaging the walls of the recess, applying means for operating the valve member to actuate the first named piston, and a lost motion connection between the valve member and the first named piston such that on the release stroke the applying means draws the said piston backwardly in the cylinder with the passages in the piston open.

JOHN W. WHITE.